United States Patent
Khaled et al.

(10) Patent No.: US 9,273,587 B2
(45) Date of Patent: Mar. 1, 2016

(54) METHOD, SYSTEM, AND APPARATUS FOR DIAGNOSING AN EXHAUST AFTERTREATMENT COMPONENT

(71) Applicant: CUMMINS IP, INC., Minneapolis, MN (US)

(72) Inventors: Nassim Khaled, Columbus, IN (US); Richard Booth, Columbus, IN (US)

(73) Assignee: Cummins IP, Inc., Minneapolis, MN (US)

(*) Notice: Subject to any disclaimer, the term of this patent is extended or adjusted under 35 U.S.C. 154(b) by 323 days.

(21) Appl. No.: 13/751,960

(22) Filed: Jan. 28, 2013

(65) Prior Publication Data
US 2014/0208721 A1 Jul. 31, 2014

(51) Int. Cl.
| | |
|---|---|
| *F01N 3/00* | (2006.01) |
| *F01N 11/00* | (2006.01) |
| *F01N 3/10* | (2006.01) |
| *F01N 3/20* | (2006.01) |
| *F01N 13/00* | (2010.01) |
| *F01N 3/021* | (2006.01) |
| *F02D 41/14* | (2006.01) |
| *F02D 41/22* | (2006.01) |

(52) U.S. Cl.
CPC .............. *F01N 11/007* (2013.01); *F01N 3/103* (2013.01); *F01N 3/208* (2013.01); *F01N 11/00* (2013.01); *F01N 3/021* (2013.01); *F01N 13/008* (2013.01); *F01N 2550/02* (2013.01); *F01N 2560/026* (2013.01); *F01N 2570/18* (2013.01); *F01N 2610/03* (2013.01); *F01N 2900/1602* (2013.01); *F01N 2900/1616* (2013.01); *F02D 41/1461* (2013.01); *F02D 41/1463* (2013.01); *F02D 41/222* (2013.01); *Y02T 10/24* (2013.01); *Y02T 10/47* (2013.01)

(58) Field of Classification Search
CPC ....... F01N 3/101; F01N 11/00; F01N 11/007; F01N 3/208; F01N 13/008; F01N 3/021; F02D 41/222
USPC ................................................ 60/276, 287
See application file for complete search history.

(56) References Cited

U.S. PATENT DOCUMENTS

| | | | |
|---|---|---|---|
| 6,367,320 B1 | 4/2002 | Kueper et al. | |
| 7,673,444 B2 | 3/2010 | Yano et al. | |
| 8,099,946 B2 | 1/2012 | Hinz et al. | |
| 2005/0287034 A1* | 12/2005 | Wills et al. | 422/52 |
| 2010/0024390 A1 | 2/2010 | Wills et al. | |
| 2010/0107609 A1 | 5/2010 | Parmentier et al. | |
| 2010/0154386 A1 | 6/2010 | Perrin et al. | |
| 2011/0023591 A1 | 2/2011 | Dobson et al. | |
| 2011/0146235 A1 | 6/2011 | Hagimoto et al. | |
| 2011/0146240 A1 | 6/2011 | Wilhelm et al. | |
| 2011/0185707 A1* | 8/2011 | Upadhyay et al. | 60/274 |

* cited by examiner

*Primary Examiner* — Jason Shanske
(74) *Attorney, Agent, or Firm* — Foley & Lardner LLP (57) ABSTRACT

According to one embodiment, an apparatus is disclosed for diagnosing a condition of a component of an exhaust aftertreatment system in exhaust receiving communication with an internal combustion engine where the exhaust aftertreatment system includes a selective catalytic reduction (SCR) catalyst. The diagnostic module is configured to determine a normalized tailpipe nitrogen-oxide $NO_x$ value based on a tailpipe $NO_x$ sensor signal and a ratio of an SCR inlet ammonia ($NH_3$) flow rate to an SCR inlet $NO_x$ flow rate. The apparatus also includes a component condition module configured to determine a condition of the component based on the normalized tailpipe $NO_x$ value.

20 Claims, 6 Drawing Sheets

METHOD, SYSTEM, AND APPARATUS FOR DIAGNOSING AN EXHAUST AFTERTREATMENT COMPONENT

FIELD

This disclosure relates generally to internal combustion engine systems, and more particularly to diagnosing the performance of a component of an exhaust aftertreatment system.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing.

Generally, emission requirements vary according to engine type. Emission tests for compression-ignition (diesel) engines typically monitor the release of carbon monoxide (CO), unburned hydrocarbons (UHC), diesel particulate matter (PM) such as ash and soot, and nitrogen oxides ($NO_x$). Oxidation catalysts have been implemented in exhaust gas aftertreatment systems to oxidize at least some particulate matter in the exhaust stream and to reduce the unburned hydrocarbons and CO in the exhaust to less environmentally harmful compounds. To remove the particulate matter, a particulate matter (PM) filter is typically installed downstream from the oxidation catalyst or in conjunction with the oxidation catalyst. With regard to reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds.

SCR systems generate ammonia to reduce the $NO_x$. When just the proper amount of ammonia is available at the SCR catalyst under the proper conditions, the ammonia is utilized to reduce $NO_x$. However, if the reduction reaction rate is too slow, or if there is excess ammonia in the exhaust, ammonia can slip out the exhaust pipe. Ammonia is an extreme irritant and an undesirable emission. Accordingly, slips of even a few tens of ppm are problematic. Additionally, due to the undesirability of handling pure ammonia, many systems utilize an alternate compound such as urea, which vaporizes and decomposes to ammonia in the exhaust stream. Presently available SCR systems treat injected urea as injected ammonia, and do not account for the vaporization and hydrolysis of urea to component compounds such as ammonia and isocyanic acid. As a result, the urea can decompose to ammonia downstream of the SCR causing ammonia slip, and less ammonia may be available for $NO_x$ reduction than the control mechanism estimates causing higher $NO_x$ emissions at the tailpipe.

Also affecting the $NO_x$ reduction performance of SCR systems are the non-ammonia components of the exhaust gas entering the SCR catalyst (i.e., SCR feedgas). SCR systems are configured to reduce $NO_x$ to $N_2$ and $H_2O$ in the presence of ammonia ($NH_3$). The most efficient chemical reaction for reducing $NO_x$ requires an optimal level of nitrogen dioxide ($NO_2$) relative to nitrogen monoxide (NO). Accordingly, the $NO_x$ reduction performance of an SCR system is based on the relative ratio of $NO_2$ and NO. Generally, if the relative amount of $NO_2$ in the SCR feedgas is low, the overall $NO_x$ reduction performance of the SCR system is correspondingly low, and the tailpipe outlet $NO_x$ is unacceptably high. Therefore, the amount of $NO_2$ in the SCR feedgas is a focus of most conventional engine systems with SCR components.

The level of $NO_2$ in the SCR feedgas is at least partially controlled by the oxidation catalyst (e.g., a diesel oxidation catalyst) downstream of the internal combustion engine and upstream of the SCR system. The oxidation catalyst is made from catalytic materials that promote the catalytic oxidation of NO into $NO_2$. Accordingly, the oxidation catalyst converts NO in the exhaust gas generated by the engine into $NO_2$. In this manner, the performance of the oxidation catalyst is tied to the $NO_x$ reduction performance of the SCR system.

The performance of a PM filter (e.g., a diesel particulate matter filter) upstream of the SCR system may also affect the $NO_x$ reduction performance of the SCR system. For example, some PM filters also oxidize NO to form $NO_2$ independent of the oxidation catalyst. Should the PM filter fail to properly convert NO to $NO_2$, the level of $NO_2$ in the SCR feedgas entering the SCR system will be adversely affected. Accordingly, the performance of the PM filter also is tied to the $NO_x$ reduction performance of the SCR system.

Current emissions regulations require the diagnostic monitoring of exhaust aftertreatment components and on-board reporting of the performance of the components in substantially real time. More specifically, current on-board diagnostic (OBD) systems must alert a vehicle operator when one or more components of an exhaust aftertreatment system are malfunctioning or performing inadequately.

SUMMARY

The subject matter of the present application has been developed in response to the present state of the art, and in particular, in response to the problems and needs in the art that have not yet been fully solved by currently available diagnostic systems for monitoring the performance of exhaust aftertreatment systems. Accordingly, the subject matter of the present application has been developed to provide methods, systems, and apparatus for monitoring and diagnosing the performance one or more components of an exhaust aftertreatment system that overcomes at least some shortcomings of the prior art. Generally, according to one embodiment, disclosed herein is an improved method, system, and apparatus for monitoring the ability of an oxidation catalyst and/or PM filter to produce a desired SCR feedgas, and alerting a vehicle operator when the oxidation catalyst and/or DPF is unable to produce the desired SCR feedgas for proper SCR system operation. In one implementation, the SCR system of the aftertreatment system is used effectively as a sensor for detecting the performance of the oxidation catalyst and/or PM filter. According to certain implementations, the effective SCR system sensor is enabled (e.g., relied upon) only during transient engine operating conditions, and in some cases, when the temperature of the SCR catalyst is within a desired operating range.

According to one embodiment, an apparatus is disclosed for diagnosing a condition of a component of an exhaust aftertreatment system in exhaust receiving communication with an internal combustion engine where the exhaust aftertreatment system includes a selective catalytic reduction (SCR) catalyst. The diagnostic module is configured to determine a normalized tailpipe nitrogen-oxide $NO_x$ value based on a tailpipe $NO_x$ sensor signal and a ratio of an SCR inlet ammonia ($NH_3$) flow rate to an SCR inlet $NO_x$ flow rate. The apparatus also includes a component condition module configured to determine a condition of the component based on the normalized tailpipe $NO_x$ value.

In some implementations of the apparatus, the component includes a hydrocarbon oxidation catalyst. In yet some implementations, the component includes a particulate matter filter.

According to certain implementations of the apparatus, the diagnostic module is configured to determine the normalized tailpipe $NO_x$ value only during transient engine operating conditions. The transient engine operating conditions can include an engine outlet $NO_x$ flux being between upper and lower engine outlet $NO_x$ flux thresholds.

In some implementations of the apparatus, the diagnostic module is configured to determine the normalized tailpipe $NO_x$ value only if a temperature condition of the SCR catalyst is within a predetermined temperature range. The temperature condition may include the sum of an SCR mid-bed temperature weighted according to a first factor and an SCR outlet exhaust temperature weighted according to a second factor.

According to some implementations, the apparatus also includes a filtering module that is configured to convert the normalized tailpipe $NO_x$ value into an exponentially weighted moving average of the normalized tailpipe $NO_x$ value. The condition of the component in such implementations is based on the exponentially weighted moving average of the normalized tailpipe $NO_x$ value. In some implementations, the component condition module determines the condition of the component based on a hysteresis of a plurality of normalized tailpipe $NO_x$ values.

In certain implementations, the diagnostic module of the apparatus can be configured to determine the normalized tailpipe $NO_x$ value only when enablement conditions are met. The enablement conditions include a temperature condition of the SCR catalyst being within a predetermined temperature range, transient engine operating conditions, the tailpipe $NO_x$ sensor signal is within a first predetermined range, an $NH_3$-to-$NO_x$ ratio entering the SCR catalyst is within a second predetermined range, there is no active component regeneration occurring, and the $NO_x$ sensor signal is currently stable. The enablement conditions may further include the rate of change of switching between ammonia reductant modes is within a predetermined range, excess hydrocarbons are not entering into the component of the exhaust aftertreatment system, the $NO_x$ sensor signal historically has been stable, and no on-board diagnostic faults are triggered.

According to another embodiment, a system includes an internal combustion engine that generates an exhaust gas and an exhaust aftertreatment system that is in exhaust gas receiving communication with the internal combustion engine. The exhaust aftertreatment system includes an exhaust treatment component and an SCR catalyst downstream of the exhaust treatment component. The system also includes a controller that is configured to determine a normalized level of $NO_x$ in exhaust gas downstream of the SCR catalyst, and further to determine a condition of the exhaust treatment component based on the normalized level of $NO_x$.

In some implementations of the system, the exhaust treatment component includes at least one of a hydrocarbon oxidation catalyst and a particulate matter filter. The system may also include a $NO_x$ sensor that is positioned downstream of the SCR catalyst and configured to detect a level of $NO_x$ in exhaust gas downstream of the SCR catalyst. The normalized level of $NO_x$ can be equal to the detected level of $NO_x$ divided by a ratio of the flow rate of ammonia entering the SCR catalyst to the flow rate of $NO_x$ entering the SCR catalyst. In some implementations, the controller determines the normalized level of $NO_x$ and the condition of the exhaust treatment components only during transient engine operating conditions and if a temperature condition of the SCR catalyst is within a predetermined temperature range.

According to yet another embodiment, a method is disclosed for diagnosing a condition of a component of an exhaust aftertreatment system in exhaust receiving communication with an internal combustion engine where the exhaust aftertreatment system includes an SCR catalyst downstream of the component. The method includes detecting a quantity of $NO_x$ in exhaust gas downstream of the SCR catalyst, normalizing the detected quantity of $NO_x$ based on a ratio of an ammonia $NH_3$ flow rate upstream of the SCR catalyst to a $NO_x$ flow rate upstream of the SCR catalyst, and determining the condition of the component based on the normalized detected quantity of $NO_x$.

In some implementations of the method, detecting the quantity of $NO_x$, normalizing the detected quantity of $NO_x$, and determining the condition of the component is performed only during transient operating conditions and when a temperature condition of the SCR catalyst is within a predetermined temperature range. In one implementation, the method also includes alerting an on-board diagnostic system of the determined condition of the component.

According to certain implementations of the method, determining the condition of the component includes comparing the normalized detected quantity of $NO_x$ to a predetermined $NO_x$ threshold. Determining the condition of the component can include upwardly incrementing a condition metric if the normalized detected quantity of $NO_x$ exceeds the predetermined threshold, and downwardly incrementing the condition metric if the normalized detected quantity of $NO_x$ is less than the predetermined threshold. Determining the condition of the component may further include assigning a first condition to the component when the condition metric equals an upper threshold and assigning a second condition to the component when the condition metric equals a lower threshold.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
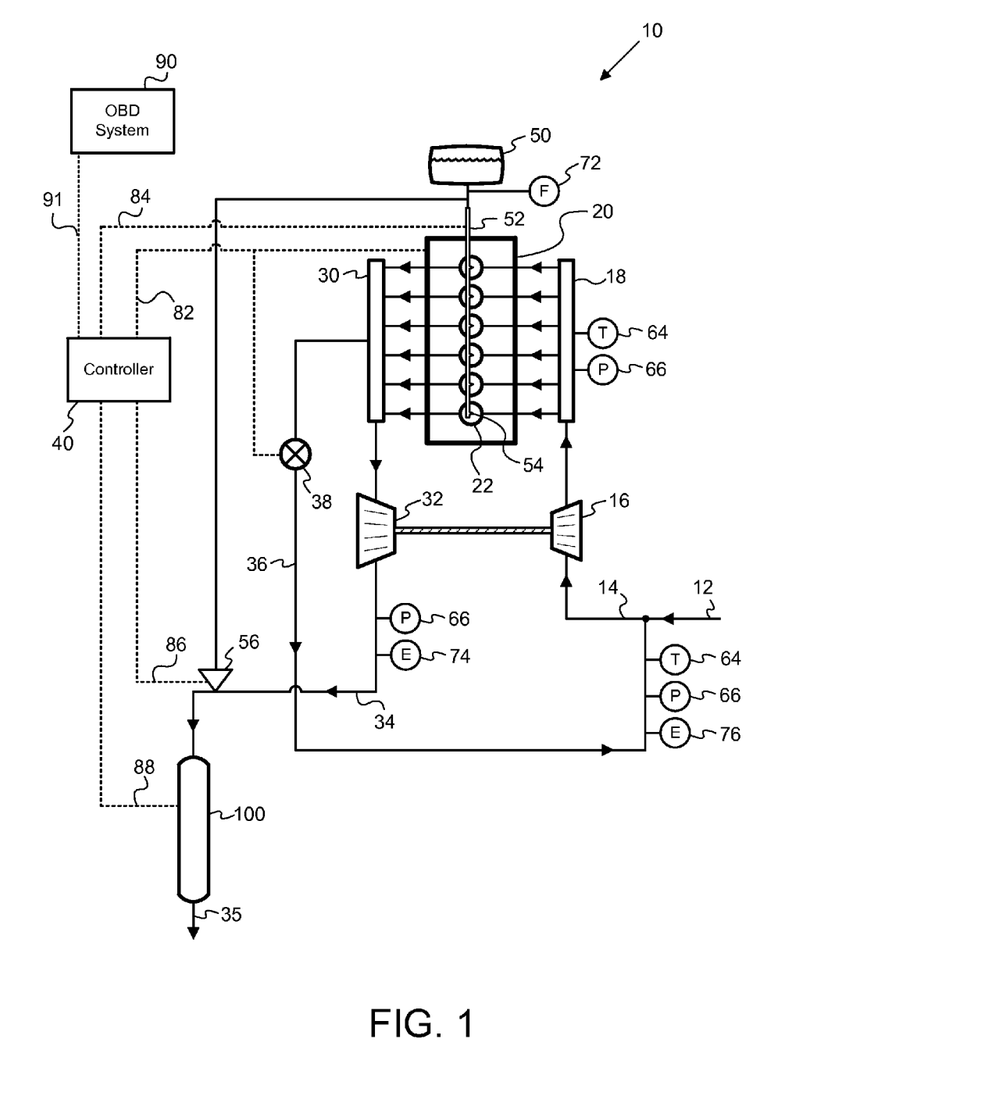
FIG. 1 is a schematic diagram of an engine system having an internal combustion engine and an exhaust aftertreatment system in accordance with one representative embodiment.

FIG. 1 depicts one embodiment of an engine system 10. The main components of the engine system 10 include an internal combustion engine 20 and an exhaust gas aftertreatment system 100 in exhaust gas-receiving communication with the engine 20. The internal combustion engine 20 can be a compression-ignited internal combustion engine, such as a diesel fueled engine, or a spark-ignited internal combustion engine, such as a gasoline fueled engine operated lean. On the intake side, the engine system 10 can include an air inlet 12, inlet piping 14, a turbocharger compressor 16, and an intake manifold 18. The intake manifold 18 includes an outlet operatively coupled to compression chambers 22 of the internal combustion engine 20 for introducing air into the compression chambers 22.

Within the internal combustion engine 20, air from the atmosphere is combined with fuel, and combusted, to power the engine. The fuel comes from the fuel tank 50 through a fuel delivery system including, in one embodiment, a fuel pump and common rail 52 to the fuel injectors 54, which inject fuel into the combustion chambers 22 of the engine 20. Fuel injection timing can be controlled by the controller 40 via a fuel injector control signal 84.

Combustion of the fuel and air in the compression chambers 22 produces exhaust gas that is operatively vented to an exhaust manifold 30. From the exhaust manifold 30, a portion of the exhaust gas may be used to power the turbocharger turbine 32. The turbocharger turbine 32 drives the turbocharger compressor 16, which may compress at least some of the air entering the air inlet 12 before directing it to the intake manifold 18 and into the compression chambers 22 of the engine 20.

For the purposes of altering the combustion properties of the engine 20, a portion of the exhaust gas may bypass the turbocharger turbine 32 and be re-circulated to the engine 20 via an exhaust gas recirculation (EGR) line 36 and back to the inlet piping 14. In one embodiment, an EGR valve 38 is actuated to divert an amount of exhaust gas corresponding to a proportion set by a controller 40 via an EGR control signal.

The portion of the exhaust gas which is not re-circulated to the engine 20 via the EGR line 36 is destined for expulsion from the engine system 10 into the atmosphere. Thus, the exhaust gas stream flows from the exhaust manifold 30 or turbocharger turbine 32, through the exhaust piping 34, and through the exhaust gas aftertreatment system 100 prior to being vented into the atmosphere through tailpipe 35. The exhaust gas aftertreatment system 100 is configured to remove various chemical compounds and particulate emissions present in the exhaust gas received from the exhaust manifold 30. Specifically, the exhaust gas treated in the exhaust gas aftertreatment system 100 contains significantly fewer pollutants, such as unburned hydrocarbons, CO, diesel particulate matter, and $NO_x$, than untreated exhaust gas.

Various sensors, such as temperature sensors 64, pressure sensors 66, fuel sensor 72, exhaust gas flow sensors 74, 76 and the like, may be strategically disposed throughout the engine system 10 and may be in communication with the controller 40 to monitor operating conditions of the engine system 10. In one embodiment, the fuel sensor 72 senses the amount of fuel consumed by the engine, and the exhaust gas flow sensor 74 senses the rate at which the exhaust gas is flowing towards exhaust gas aftertreatment system 100.

Also, the engine system 10 may include an on-board diagnostic (OBD) system 90 in electronic communication with the controller 40 via the control signal 91. Generally, the OBD system 90 is configured to alert a user (e.g., vehicle operator) of any operating condition faults monitored and triggered by the controller 40.

Figure 2:
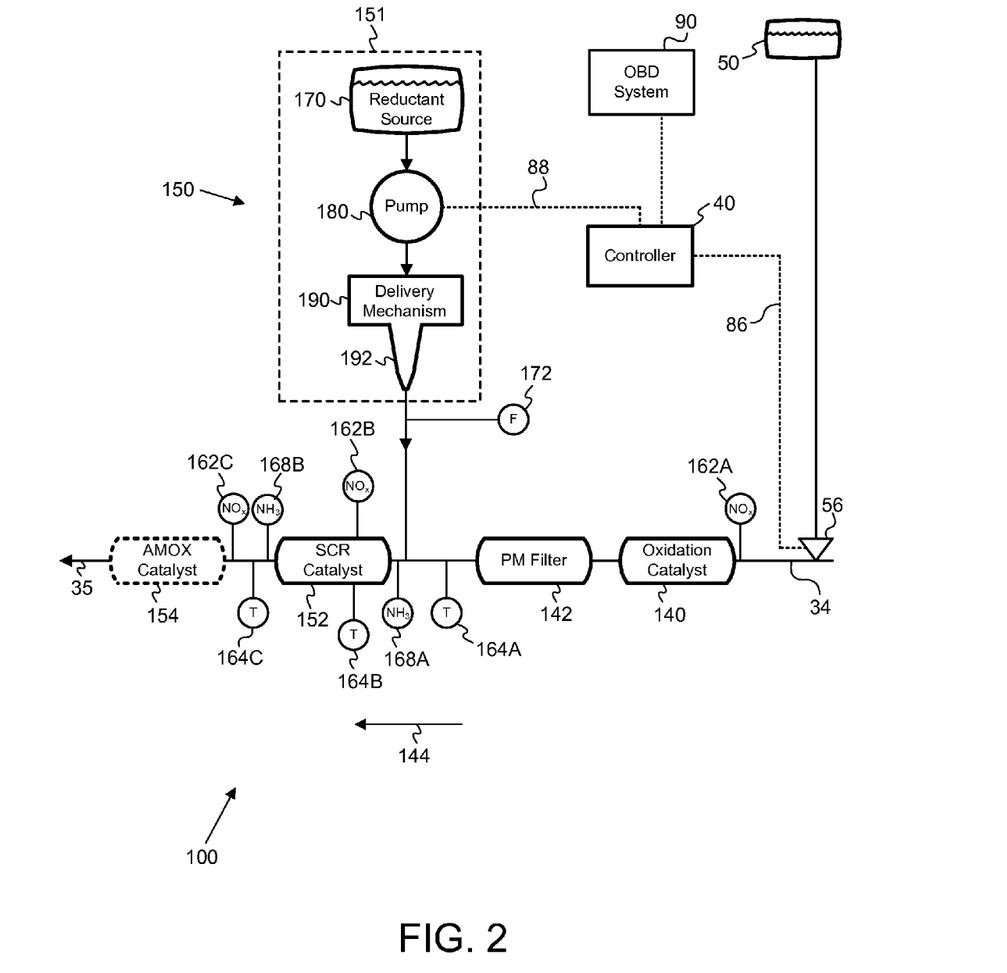
FIG. 2 is a schematic diagram of the exhaust aftertreatment system of FIG. 1 in accordance with one representative embodiment.

Referring now to FIG. 2, the exhaust gas aftertreatment system 100 includes the controller 40, the OBD system 90, an oxidation catalyst 140, a PM filter 142, an SCR system 150, and an optional ammonia oxidation (AMOX) catalyst 154. The SCR system 150 has a reductant delivery system 151 and an SCR catalyst 152. The oxidation catalyst 140 can be any of various oxidation catalysts known in the art, such as a non-methane hydrocarbon catalyst. The PM filter 142 may be any of various particulate matter or other filters known in the art.

In an exhaust flow direction, as indicated by directional arrow 144, exhaust gas may flow from the exhaust piping 34, through the oxidation catalyst 140, through the PM filter 142, through the SCR catalyst 152, through the AMOX catalyst 154 if present, and then be expelled into the atmosphere through the tailpipe 35. Thus, in the illustrated embodiment the PM filter 142 is positioned downstream of the oxidation catalyst 140, the SCR catalyst 152 is positioned downstream of the PM filter 142, and the AMOX catalyst 154 is positioned downstream of the SCR catalyst 152. However, other arrangements of the components of the exhaust gas aftertreatment system 100 are also possible.

The oxidation catalyst 140 can have any of various flow-through designs known in the art, such as conventional diesel oxidation catalysts. Generally, the oxidation catalyst 140 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 140 may sufficiently reduce the hydrocarbon and CO concentrations in the exhaust to meet the requisite emissions standards for those components of the exhaust gas. An indirect consequence of the oxidation capabilities of the oxidation catalyst 140 is the ability of the oxidation catalyst to oxidize nitrogen monoxide (NO) into $NO_2$. In this manner, the level of $NO_2$ exiting the oxidation catalyst 140 is equal to the $NO_2$ in the exhaust gas generated by the engine 20 plus the $NO_2$ converted from NO by the oxidation catalyst.

In addition to treating the hydrocarbon and CO concentrations in the exhaust gas, the oxidation catalyst 140 can also be used in the controlled regeneration of the PM filter 142 and the SCR catalyst 152. This can be accomplished through the injection, or dosing, of unburned hydrocarbons "UHC" into the exhaust gas upstream of the oxidation catalyst 140. Upon contact with the oxidation catalyst 140, the UHC undergoes an exothermic oxidation reaction which leads to an increase in the temperature of the exhaust gas exiting the oxidation catalyst 140 and subsequently entering the PM filter 142 and/or SCR catalyst 152. The amount of UHC added to the exhaust gas is selected to achieve the desired temperature increase or target controlled regeneration temperature.

The PM filter 142 can be any of various flow-through designs known in the art, including diesel particulate filters (DPF), and configured to reduce particulate matter concentrations, e.g., soot and ash, in the exhaust gas to meet requisite emission standards. In addition, the exhaust gas aftertreatment system 100 can further include a variety of sensors surrounding the PM filter 142 and which are electrically coupled to the controller 40.

The SCR system 150 includes a reductant delivery system 151 comprising a reductant source 170, pump 180 and delivery mechanism 190. The reductant source 170 can be a container or tank capable of retaining a reductant, such as, for example, ammonia ($NH_3$), urea, diesel fuel, or diesel oil. The reductant source 170 is in reductant supplying communication with the pump 180, which is configured to pump reductant from the reductant source to the delivery mechanism 190. The delivery mechanism 190 can include a reductant injector schematically shown at 192 positioned upstream of the SCR catalyst 152. The injector is selectively controllable to inject reductant directly into the exhaust gas stream prior to entering the SCR catalyst 152.

In some embodiments, the reductant can either be ammonia or urea, which decomposes to produce ammonia. The ammonia reacts with $NO_x$ in the presence of the SCR catalyst 152 to reduce the $NO_x$ to less harmful emissions, such as $N_2$ and $H_2O$. The $NO_x$ in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. However, as discussed above, the chemical reduction of $NO_2$ to $N_2$ and $H_2O$ typically is the most efficient chemical reaction. Therefore, in general, the more $NO_2$ in the exhaust gas stream compared to NO, the more efficient the $NO_x$ reduction performed by the SCR catalyst. Accordingly, the ability of the oxidation catalyst 140 to convert NO to $NO_2$ directly affects the $NO_x$ reduction efficiency of the SCR system 150. Put another way, the $NO_x$ reduction efficiency of the SCR system 150 corresponds at least indirectly to the condition or performance of the oxidation catalyst 140. For example, a poorly performing (e.g., poorly conditioned) oxidation catalyst 140 may be more to blame for the presence of excess $NO_x$ exiting the tailpipe than any deficiencies associated with the SCR system 150. Therefore, the SCR system 150 (and the associated $NO_x$ reduction performance of the SCR system 150) can act as a sensor to determine the condition of the oxidation catalyst 140.

Additionally, as discussed above, some PM filters oxidize NO to form $NO_2$ independent of the oxidation catalyst. Accordingly, a poorly performing (e.g., poorly conditioned) PM filter 142 may be more to blame for the presence of excess $NO_x$ exiting the tailpipe than any deficiencies associated with the SCR system 150. For this reason, the SCR system 150 can act as a sensor to determine the condition of the PM filter 142.

The SCR catalyst 152 can be any of various catalysts known in the art. For example, in some implementations, the SCR catalyst 152 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 152 is a zeolite-based catalyst.

The AMOX catalyst 154 can be any of various flow-through catalysts configured to react with ammonia to produce mainly nitrogen. Generally, the AMOX catalyst 154 is utilized to remove ammonia that has slipped through or exited the SCR catalyst 152 without reacting with $NO_x$ in the exhaust. In certain instances, the aftertreatment system 100 can be operable with or without an AMOX catalyst. Further, although the AMOX catalyst 154 is shown as a separate unit from the SCR catalyst 152, in some implementations, the AMOX catalyst can be integrated with the SCR catalyst, e.g., the AMOX catalyst and the SCR catalyst can be located within the same housing.

The embodiment of the exhaust aftertreatment system 100 illustrated in FIG. 2 incorporates multiple $NO_x$ sensors, which measure the amount (e.g., flow rate) of $NO_x$ in the exhaust gas throughout the exhaust treatment process. In some implementations, the exhaust aftertreatment system 100 may include one or more of an engine out $NO_x$ sensor 162A upstream of the oxidation catalyst 140 and downstream of the engine 20, an SCR mid-bed $NO_x$ sensor 162B embedded within the SCR catalyst 152, a tailpipe $NO_x$ sensor 162C downstream of the SCR catalyst 152 (and downstream of the AMOX catalyst 154 in some embodiments).

The exhaust aftertreatment system 100 can also utilize various other sensors for detecting corresponding characteristics of the exhaust gas or components. For example, the illustrated exhaust aftertreatment system 100 may include one or more of an SCR inlet temperature sensor 164A upstream of the SCR catalyst, an SCR mid-bed temperature sensor 164B embedded within the SCR catalyst, an SCR outlet temperature sensor 164C downstream of the SCR catalyst, an SCR inlet $NH_3$ sensor 168A upstream of the SCR catalyst 152, and an SCR outlet $NH_3$ sensor 168B located downstream of the SCR catalyst, and the like. In some cases, a $NO_x$ sensor and an $NH_3$ sensor may be combined into a dual ammonia-$NO_x$ sensor (not shown). The various sensors may be in electrical communication with the controller 40 to allow the controller monitor the operating conditions of the exhaust aftertreatment system 100 of the engine system 10.

Although the exhaust aftertreatment system 100 shown includes one of an oxidation catalyst 140, PM filter 142, SCR catalyst 152, and AMOX catalyst 154 positioned in specific locations relative to each other along the exhaust flow path, in other embodiments, the exhaust aftertreatment system may include more than one of any of the various catalysts positioned in any of various positions relative to each other along the exhaust flow path as desired. Further, although the oxidation catalyst 140 and AMOX catalyst 154 are non-selective catalysts, in some embodiments, the oxidation and AMOX catalysts can be selective catalysts.

The controller 40 controls the operation of the engine system 10 and associated sub-systems, such as the internal combustion engine 20 and the exhaust gas aftertreatment system 100. The controller 40 is depicted in FIGS. 1 and 2 as a single physical unit, but can include two or more physically separated units or components in some embodiments if desired. Generally, the controller 40 receives multiple inputs, processes the inputs, and transmits multiple outputs. The multiple inputs may include sensed measurements from the sensors and various user inputs. The inputs are processed by the controller 40 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions.

For example, the operating conditions of the internal combustion engine 20 and the exhaust gas aftertreatment system 100 can be ascertained from any of the sensors or from the controller's 40 commands to the engine regarding the fraction of exhaust gas recirculation, injection timing, and the like. In one embodiment, information is gathered regarding, for example, fuel rate, engine speed, engine load, the timing at which fuel injection timing is advanced or retarded (SOI, or start of injection), the fraction of exhaust gas recirculation, driving conditions, exhaust flow rate, the amount of $O_2$, $NO_x$ (e.g., $NO_2$ and NO), and $NH_3$ in the exhaust gas, and exhaust gas temperatures and pressures at various locations within the exhaust gas aftertreatment system 100.

The controller 40 includes various modules for controlling the operation of the engine system 10. For example, the controller 40 includes one or more modules for controlling the operation of the internal combustion engine 20. The controller 40 further includes one or more modules for controlling the operation and regeneration of the SCR system 150. Additionally, the controller 40 include one or more modules for diagnosing the performance or conditions of one or more components of the exhaust aftertreatment system 100, and reporting the diagnosed performance or conditions to the OBD system 90.

As is known in the art, the controller 40 and its various modular components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

Figure 3:
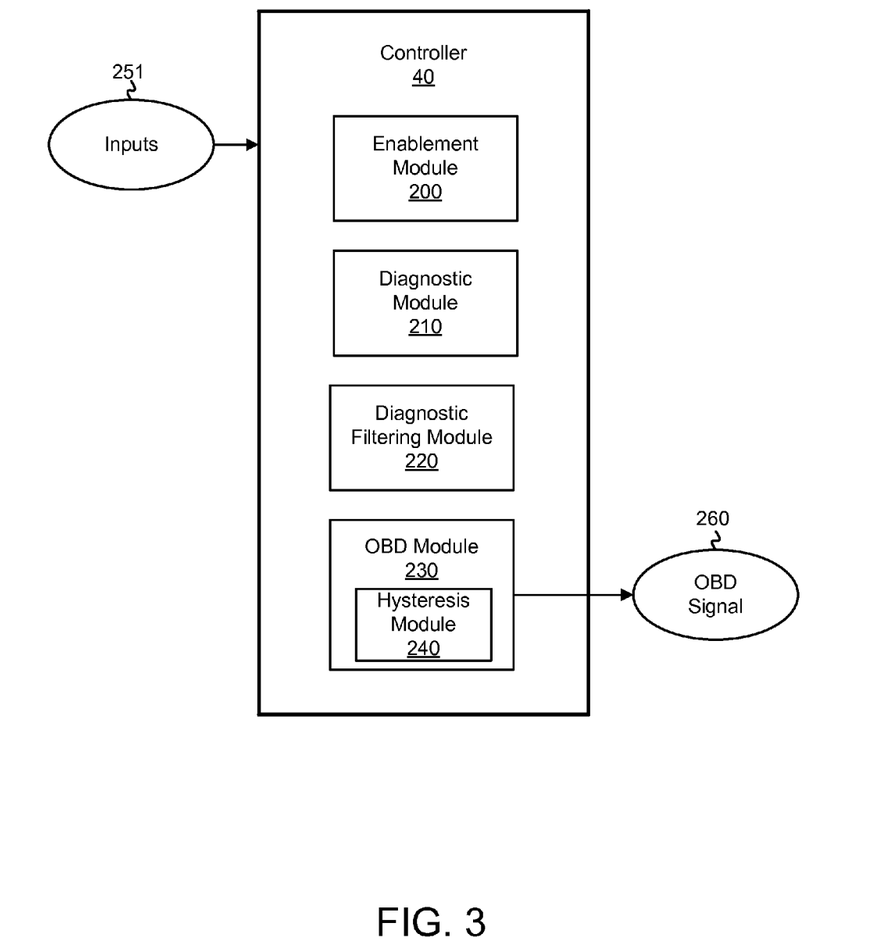
FIG. 3 is a schematic block diagram of a controller of the engine system of FIG. 1 in accordance with one representative embodiment.

Referring to FIG. 3, the controller 40 includes an enablement module 200, a diagnostic module 210, a diagnostic filtering module 220, and an OBD module 230 with a hysteresis module 240. Generally, the controller 40 receives inputs 251 and generates an OBD signal 260 based on at least one of the inputs. The OBD signal 260 is communicated to the OBD system 90 via the control signal 91. In response to the OBD signal 260, the OBD system 90 may alert (e.g., provide an indication of an operating condition of the engine system 10 to) a user. In some implementations, the OBD signal 260 includes data concerning the triggering of a fault associated with a malfunctioning or poorly performing component, such as the oxidation catalyst 140 and/or PM filter 142. The diagnostic module 210, diagnostic filtering module 220, and OBD module 230 operate cooperatively to monitor and diagnose the performance of a component of the aftertreatment system 100, and issue an OBD signal 260 indicating the diagnosed condition of the component, based on one or more of the inputs 251. In certain embodiments, operation of the diagnostic module 210, diagnostic filtering module 220, and OBD module 230 is performed only when enabled by the enablement module 200.

Figure 4:
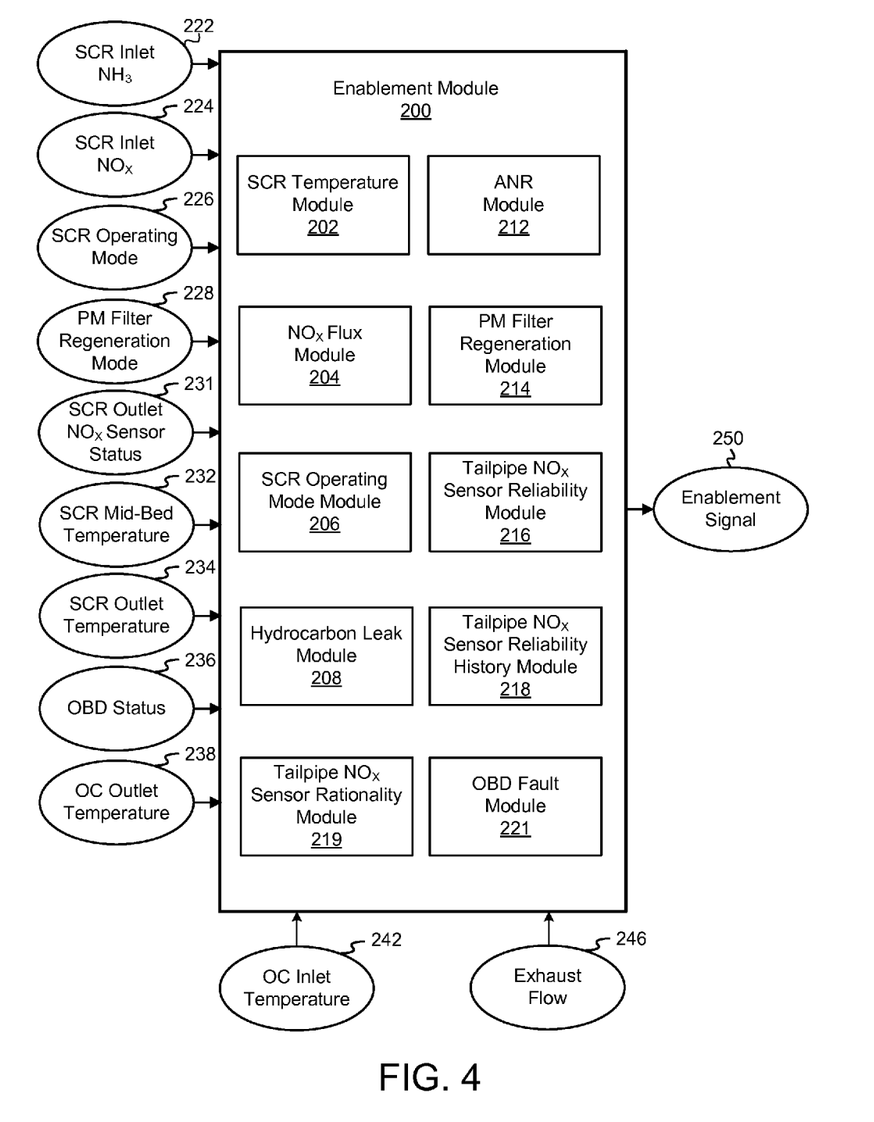
FIG. 4 is a schematic block diagram of an enablement module of the controller of FIG. 3 in accordance with one representative embodiment.

As shown in FIG. 4, the enablement module 200 is configured to generate an enablement signal 250 based on the operation of at least one of a plurality of modules. Each of the modules of the enablement module 200 is configured to monitor and determine whether a respective enablement condition has been met. The enablement module 200 generates an enablement signal 250 based on whether one or more of the enablement conditions as desired have been met. For example, the enablement signal 250 commands enablement of the diagnostic module 210, diagnostic filtering module 220, and OBD module 230 if the one or more enablement conditions have been met. In contrast, the enablement signal 250 commands disablement of the diagnostic module 210, diagnostic filtering module 220, and OBD module 230 if the one or more enablement conditions have not been met.

The enablement module 200 may include an SCR temperature module 202 configured to monitor a temperature condition of the SCR catalyst 152 and determine whether the SCR temperature condition meets an associated enablement threshold. In some implementations, the enablement threshold is an SCR temperature threshold range defined between a lower temperature threshold and an upper temperature threshold, such that the SCR temperature enablement threshold is met if the SCR temperature condition falls within the SCR temperature threshold range. The difference between the upper and lower temperature threshold can be a predetermined temperature value, such as 25° C. in one embodiment. In one implementation, the lower temperature threshold is 250° C. and the upper temperature threshold is 275° C. In some embodiments, the upper temperature threshold is less than about 300° C. to avoid $NH_3$ release and deposit cleaning that may affect the accuracy of the component performance diagnosis by the controller 40. Preferably, in certain implementations, the SCR temperature threshold range is selected such that the SCR temperature condition during operation of the engine system 10 is within the range at least 20% of the time.

Generally, SCR $NO_x$ reduction efficiency is dependent on the temperature of the SCR catalyst. Accordingly, in one embodiment, the SCR temperature condition is a detected or estimated temperature of the SCR catalyst bed. In another embodiment, the SCR temperature condition is a weighted temperature of the SCR catalyst bed. The weighted temperature of the SCR catalyst bed can be equal to the sum of a weighted SCR mid-bed temperature (e.g., based on an SCR mid-bed temperature input 232) and a weighted SCR outlet exhaust temperature (e.g., based on an SCR outlet temperature input 234). The SCR mid-bed temperature can be detected by the physical mid-bed temperature sensor 164B, or estimated by a virtual sensor according to methods known in the art. The SCR outlet exhaust temperature can be detected by the SCR outlet temperature sensor 164C, or estimated by a virtual sensor according to methods known in the art. The relative weighting of the SCR mid-bed temperature and SCR outlet exhaust temperature can vary as desired. In one implementation, the SCR mid-bed exhaust temperature is weighted by being multiplied by a first weighting factor and the SCR outlet exhaust temperature is weighted by being multiplied by a second weighting factor. The first and second weighting factors may be the same or different. In one implementation, the first and second weighting factors each is a fraction less than unity, and the sum of the first and second weighting factors may equal unity. For example, in one specific implementation, the first weighting factor is 0.9 and the second weighting factor is 0.1.

The enablement module 200 may also include a $NO_x$ flux module 204 configured to monitor the flux of $NO_x$ exiting the engine 20 (e.g., based on an SCR inlet $NO_x$ input 224 and exhaust flow input 246), or entering the SCR catalyst 152, and determine whether the $NO_x$ flux meets an associated enablement threshold. The $NO_x$ flux exiting the engine 20 may be determined using the physical $NO_x$ sensor 162A and/or a virtual $NO_x$ sensor using a model-based approach.

The $NO_x$ flux enablement threshold may be a $NO_x$ flux threshold range defined between a lower $NO_x$ flux threshold and an upper $NO_x$ flux threshold, such that the $NO_x$ flux enablement threshold is met if the $NO_x$ flux falls within the $NO_x$ flux threshold range. The upper $NO_x$ flux threshold may be equal to the lower $NO_x$ flux threshold multiplied by a precalibrated weighting factor. In some implementations, the precalibrated weighting factor is between about 1.5 and 5. In one implementation, the precalibrated weighting factor is about 3.333. The lower $NO_x$ flux threshold may be precalibrated based on the configuration and dynamics of a particular engine system to ensure that the $NO_x$ flux out of the engine is greater than the lower $NO_x$ flux threshold for a desired percentage of the time an engine is operating. For example, in one specific implementation, on average, the $NO_x$ flux out of the engine 20 is greater than the lower $NO_x$ flux threshold about 25% of the time, and less than the lower $NO_x$ flux threshold about 75% of the time. Generally, in some embodiments, the $NO_x$ flux enablement threshold ensures that the component performance diagnosis of the controller 40 is run during relatively high $NO_x$ flux conditions, which occur less often, but not run during low or extremely high $NO_x$ flux conditions, which occur more often.

In some embodiments, the $NO_x$ flux module 204 may be configured to monitor a condition of the engine that is proportional to the flux of $NO_x$ exiting the engine 20, and determine whether that condition meets an associated enablement threshold. For example, the $NO_x$ flux module 204 can monitor one or more of a speed and torque of the engine, and determine whether the speed and torque meet as associated speed and torque enablement threshold associated with a desired $NO_x$ flux threshold. In certain implementations, the desired $NO_x$ flux threshold corresponds with a transient condition threshold of the engine, such as a torque demand change threshold, a fuel demand change threshold, and an engine speed change threshold.

The enablement module 200 may also include an SCR operating mode module 206 configured to monitor the operating mode of the SCR system 150 (e.g., based on an SCR operating mode input 226), and determine whether an operating mode condition of the SCR system meets an associated enablement threshold. In one embodiment, the SCR operating mode module 206 monitors reductant injection modes of the SCR system 150, and determines the rate of change of switching between reductant injection modes (e.g., the rate at which the reductant injection mode changes over time). Generally, the SCR operating mode enablement threshold is associated with a relative high reductant injection mode rate of change such that the controller 40 diagnoses the component performance when the rate of change of the reductant injection amount is relatively high. The enablement threshold can be a threshold range between a lower reductant injection mode rate of change threshold and a higher reductant injection mode rate of change threshold. In some implementations, the SCR operating mode module 206 filters a plurality of reductant injection mode rate of change values to determine an average reductant injection mode rate of change value, and compares the average value to the associated enablement threshold.

Additionally, the enablement module 200 can include a hydrocarbon leak module 208 configured to monitor the amount of excess hydrocarbons in the exhaust gas stream entering the component (e.g., based on an oxidation catalyst (OC) outlet temperature input 238 and OC inlet temperature input 242), and determine whether the amount of excess hydrocarbons meets an associated enablement threshold. Generally, for oxidation catalyst components, excess hydrocarbons entering the component may reduce the ability of the component to oxidize NO to produce $NO_2$ because the oxidation sites of the component would be used to oxidize the excess hydrocarbons instead. Because the oxidation of hydrocarbons is an exothermic reaction, excess hydrocarbons in the exhaust gas stream upstream of the oxidation catalyst component may be related to, or determined based on, the detection of a temperature difference across the oxidation catalyst. For example, if a detected temperature difference the oxidation catalyst exceeds a temperature threshold, then it can be assumed that too much excess hydrocarbons are being leaked into the oxidation catalyst for the controller 40 to provide an accurate diagnosis of the performance of the component. Accordingly, the enablement condition is met if the detected temperature difference is less than the temperature threshold, and the enablement condition is not met if the detected temperature difference is more than the temperature threshold. In some implementations, the temperature threshold is between about 50° C. and about 100° C. According to one particular implementation, the temperature threshold is about 75° C.

The enablement module 200 may also include a tailpipe $NO_x$ sensor rationality module 219 configured to monitor the signal (e.g., the tailpipe $NO_x$ signal 261) of the tailpipe $NO_x$ sensor 162C (or any sensor sensitive to $NO_x$), and determine if the $NO_x$ value associated with the monitored signal meets an associated enablement threshold. The $NO_x$ sensor signal enablement threshold may be a $NO_x$ sensor signal threshold range defined between a lower $NO_x$ sensor threshold and an upper $NO_x$ sensor threshold, such that the $NO_x$ sensor signal enablement threshold is met if the $NO_x$ sensor signal falls within the $NO_x$ sensor signal threshold range. Generally, $NO_x$ sensor signals above the upper $NO_x$ sensor threshold are considered irrational and shouldn't be relied upon in the component performance diagnosis of the controller 40. In one implementation, the lower $NO_x$ sensor threshold is about zero ppm and the upper $NO_x$ sensor threshold is about 1,100 ppm.

Additionally, the enablement module 200 may include an ammonia-to-$NO_x$ ratio (ANR) module 212 configured to monitor the ANR value of exhaust gas entering the SCR catalyst 152 (e.g., based on an SCR inlet $NH_3$ input 222 and the SCR inlet $NO_x$ input 224), and determine if the ANR value meets an associated enablement threshold. The ANR enablement threshold may be an ANR enablement threshold range defined between a lower ANR value threshold and an upper ANR value threshold, such that the ANR enablement threshold is met if the monitored ANR value falls within the ANR enablement threshold range. Generally, ANR values below the range are insufficient, and ANR values above the range are too high, for proper $NO_x$ reduction on the SCR catalyst 152. Accordingly, ANR values outside the ANR enablement threshold range will negatively affect the accuracy of the component performance diagnosis of the controller 40, and thus the diagnosis should not be enabled under such conditions. In one implementation, the lower ANR value threshold is about 0.8 and the upper ANR value threshold is about 2.1.

The enablement module 200 may further include a PM filter regeneration module 214 configured to monitor the regeneration status of the PM filter 142 (e.g., based on a PM filter regeneration mode input 228), and determine if the regeneration status of the PM filter meets an associated enablement threshold. The PM filter regeneration enablement threshold is associated with the occurrence of an ongoing regeneration event on the PM filter 142. For example, the PM filter regeneration enablement threshold is met if a regeneration event on the PM filter 142 is not occurring, and not met if a regeneration event on the PM filter is occurring. An ongoing regeneration event on the PM filter can be determined based on the triggering of regeneration commands by the controller 40, or by detecting a predetermined temperature increase in the exhaust gas entering the PM filter 142.

Additionally, the enablement module 200 may include a tailpipe $NO_x$ sensor reliability module 216 configured to monitor the current reliability of the tailpipe $NO_x$ sensor 162C (e.g., based on an SCR outlet $NO_x$ sensor status input 231), and determine if the current reliability of the tailpipe $NO_x$ sensor meets an associated enablement threshold. The $NO_x$ sensor reliability enablement threshold is associated with the current reliability status or stability of the $NO_x$ sensor 162C. For example, the $NO_x$ sensor reliability enablement threshold is met if the current reliability status of the $NO_x$ sensor 162C indicates a reliable sensor, and the enablement threshold is not met if the current reliability status of the $NO_x$ sensor indicates an unreliable sensor. In the case of a smart $NO_x$ sensor, the status of the $NO_x$ sensor can be determined by a control module of the sensor, which communicates the status to the controller 40.

The enablement module 200 may still include a tailpipe $NO_x$ sensor reliability history module 218 configured to monitor the history of the reliability status of the tailpipe $NO_x$ sensor 162C (e.g., based on the SCR outlet $NO_x$ sensor status input 231 or other similar input), and determine if the historic reliability status of the tailpipe $NO_x$ sensor meets an associated enablement threshold. The historic $NO_x$ sensor reliability enablement threshold is associated with a threshold time period during which the $NO_x$ sensor reliability status must remain reliable or stable. In some implementations, the threshold time period is about 90 seconds.

Further, the enablement module 200 may include an OBD fault module 221 configured to monitor the fault status of the OBD system 90 (e.g., based on the OBD status input 236), and determine if the fault status of the OBD system meets an associated threshold. The OBD fault enablement threshold is associated with one or more triggerable faults of the OBD system 90. Generally, if preselected triggerable faults of the OBD system 90 are not triggered, then the OBD fault enablement threshold is met. However, if one or more of the preselected triggerable faults of the OBD system 90 are triggered, then the OBD fault enablement threshold is not met. The preselected triggerable faults can be any of various condition faults monitored by the OBD system 90 and affecting the performance of the engine system 10 generally and the accuracy of the component performance diagnosis of the controller 40 specifically.

The enablement conditions selected to control enablement of the modules 210, 220, 230 are defined as controlling enablement conditions. When all controlling enablement conditions have been met, the enablement signal 250 includes enablement instructions and is communicated to the modules 210, 220, 230 to enable the monitoring and diagnosing of the performance of the component. However, if one of the controlling enablement conditions has not been met, the enablement signal 250 includes non-enablement instructions and is communicated to the modules 210, 220, 230 to disable the monitoring and diagnosing of the performance of the component. Generally, enablement of the controlling enablement conditions ensures proper operation of the engine system 10 generally, and the SCR system 150 more specifically, so that the SCR system can be relied upon as an effective component sensor to detect the performance of components upstream of the SCR system.

The controlling enablement conditions can be any one or more of the respective enablement conditions monitored by the modules of the enablement module 200. For example, in one embodiment, only the SCR temperature and $NO_x$ flux enablement conditions must meet the respective enablement thresholds for the modules 210, 220, 230 to be enabled. However, in other embodiments, fewer or more than the SCR temperature and $NO_x$ flux enablement conditions must meet the respective enablement thresholds for the modules 210, 220, 230 to be enabled. Generally, the number and selection of the controlling enablement conditions are based on any of various factors, such as user preference, engine application, engine age, vehicle type, and the like.

Figure 5:
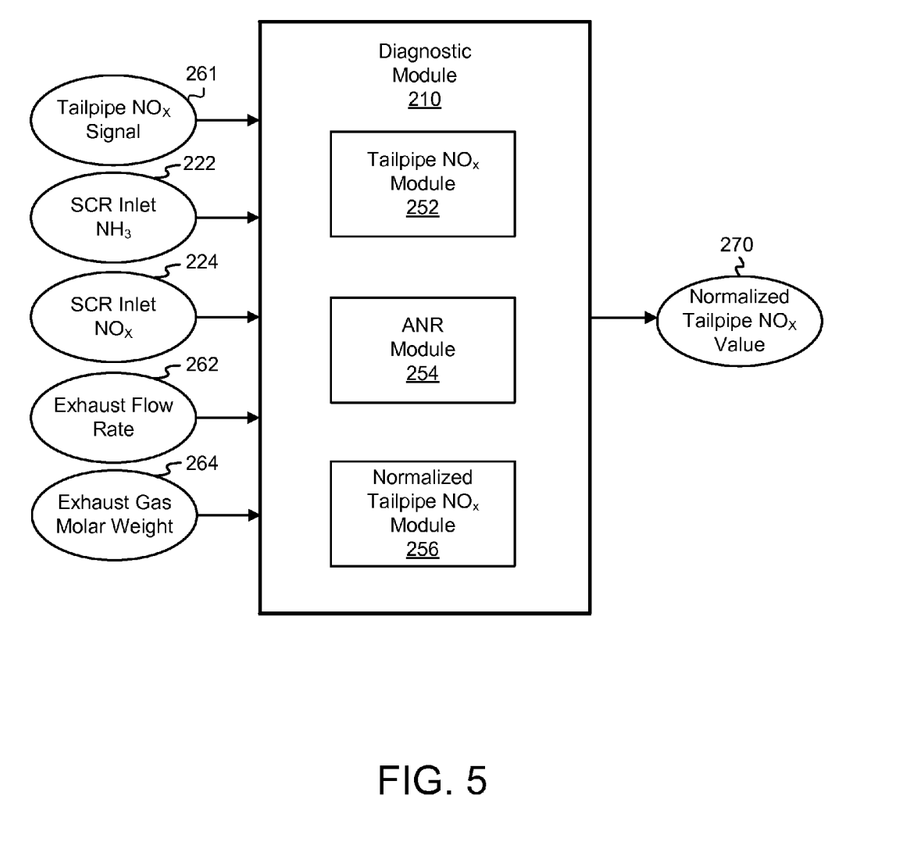
FIG. 5 is a schematic block diagram of a diagnostic module of the controller of FIG. 3 in accordance with one representative embodiment.

The diagnostic module 210 is enabled to determine a normalized tailpipe $NO_x$ value if the controlling enablement conditions meet the associated enablement thresholds. As shown in FIG. 5, the diagnostic module 210 includes a tailpipe $NO_x$ module 252, an ammonia-to-$NO_x$ ratio (ANR) module 254, and a normalized tailpipe $NO_x$ module 256.

The tailpipe $NO_x$ module 252 determines the detected flow rate of $NO_x$ in the exhaust gas stream downstream of the SCR catalyst 152 and upstream of the tailpipe 35 (i.e., detected tailpipe $NO_x$ flow rate). In one implementation, the tailpipe $NO_x$ module 252 determines the detected tailpipe $NO_x$ flow rate based on the tailpipe $NO_x$ signal 261 received from the tailpipe $NO_x$ sensor 162C. The value of the detected tailpipe $NO_x$ flow rate can be provided in units of parts per million (ppm) or other measurement of flow rate, such as, for example, mol/s.

The ANR module 254 determines the ANR of exhaust gas entering the SCR catalyst 152 (e.g., SCR inlet ANR). The ANR module 254 determines the SCR inlet ANR based on the SCR inlet $NH_3$ value 222 and the SCR inlet $NO_x$ value 224. Generally, the SCR inlet ANR is equal to the ratio of the SCR inlet $NH_3$ value 222 to the SCR inlet $NO_x$ value 224 (i.e., the SCR inlet $NH_3$ value 222 divided by the SCR inlet $NO_x$ value 224. The SCR inlet $NH_3$ value 222 and SCR inlet $NO_x$ value 224 share the same units. In one implementation, the SCR inlet $NH_3$ value 222 and the SCR inlet $NO_x$ value 224 are provided in units of mol/s. The SCR inlet $NH_3$ value 222 and the SCR inlet $NO_x$ value 224 may be based on one or more of a physical sensor and virtual sensor. For example, in one implementation, the SCR inlet $NH_3$ value 222 is based on an SCR inlet $NH_3$ signal received from the SCR inlet $NH_3$ sensor 168A upstream of the SCR catalyst, and the SCR inlet $NO_x$ value 224 is based on an engine out $NO_x$ signal received from the engine out $NO_x$ sensor 162A.

The SCR inlet $NH_3$ signal may be in terms of mol/s and the engine out $NO_x$ signal may be in terms of parts per million. Accordingly, in some implementations, the engine out $NO_x$ signal is converted to mol/s prior to determining the SCR inlet ANR. The engine out $NO_x$ signal may be converted to mol/s by (1) multiplying the engine out $NO_x$ signal by the conversion constant of $10^{-6}$; (2) multiplying the engine out $NO_x$ signal by an exhaust flow rate 262 into the SCR catalyst; and (3) dividing the engine out $NO_x$ signal by an exhaust gas molar weight 264. The exhaust flow rate 262 can be obtained from measurements taken by a physical sensor, such as exhaust gas flow sensor 74, or can be obtained from a virtual sensor. The exhaust gas molar weight 264 can also be obtained from one or both of a physical sensor or virtual sensor. The exhaust gas flow rate 262 can be in units of g/s, with the exhaust gas molar weight being in compatible units.

The normalized tailpipe $NO_x$ module 256 calculates the normalized tailpipe $NO_x$ value 270 based on the detected tailpipe $NO_x$ flow rate determined by the tailpipe $NO_x$ module 252 and the SCR inlet ANR determined by the ANR module 254. Generally, the normalized tailpipe $NO_x$ value 270 is equal to the detected tailpipe $NO_x$ signal 261 divided by the ANR entering the SCR catalyst 152 (e.g., $NO_x$/ANR). For example, in one implementation, the normalized tailpipe $NO_x$ module 256 calculates the normalized tailpipe $NO_x$ value 270 according to the following equation $$NO_{x,norm} = \frac{NO_{x,detected}}{(NH_3)/NO_x} \qquad (1)$$

where $NO_{x,norm}$ is the normalized tailpipe $NO_x$ value, $NO_{x,detected}$ is the detected tailpipe $NO_x$ flow rate (e.g., as detected by a physical tailpipe $NO_x$ sensor), $NH_3$ is the amount of ammonia at the inlet of the SCR catalyst 152, and $NO_x$ is the amount of $NO_x$ at the inlet of the SCR catalyst. After being calculated by the normalized tailpipe $NO_x$ module 256, normalized tailpipe $NO_x$ value 270 is communicated to the diagnostic filtering module 220 for further analysis.

Referring back to FIG. 3, the diagnostic filtering module 220 is configured to convert the normalized tailpipe $NO_x$ value 270 into an average normalized tailpipe $NO_x$ value based on an average of a plurality of normalized tailpipe $NO_x$ values 270 calculated by the normalized tailpipe $NO_x$ module 256. Generally, utilizing an average normalized tailpipe $NO_x$ value helps to eliminate or filter outlying or anomalous normalized tailpipe $NO_x$ value calculations. The average normalized tailpipe $NO_x$ can be determined by the diagnostic filtering module 220 using any of various averaging or filtering techniques. In one embodiment, the average normalized tailpipe $NO_x$ value is determined using a moving or rolling average technique, such as an exponentially weighted moving average, which utilizes an infinite impulse response filter that applies weighting factors that decrease exponentially. Accordingly, the average normalized tailpipe $NO_x$ is the normalized tailpipe $NO_x$ value 270, but adjusted according to an average of a history of normalized tailpipe $NO_x$ values 270. The average normalized tailpipe $NO_x$ is communicated to the OBD module 230 for further analysis.

The OBD module 230 includes a hysteresis module 240 configured to determine the condition of the component based on the average normalized tailpipe $NO_x$ received from the diagnostic filtering module 220. According to one embodiment, the condition of the component is one of 'pass' and 'fail.' However, in other embodiments, the condition of the component can be other status identifiers indicative of the condition of the component, such as 'good' and 'bad,' 'fresh' and 'aged,' or other numerical or alphanumeric indication of the component's condition.

In one implementation, the hysteresis module 240 determines the condition of the component according to a hysteresis-based approach. Generally, the hysteresis-based approach can include a first comparison of the average normalized tailpipe $NO_x$ value to a $NO_x$ threshold, adjusting an aggregate decision counter based on the first comparison, and setting the condition of the component based on a second comparison of the aggregate decision counter and predetermined count thresholds. In some implementations, the $NO_x$ threshold is precalibrated based on experimental data, actual use data, and the like, and may be obtained from a look-up table. Alternatively, the $NO_x$ threshold may be dynamically calculated based on operating conditions of the engine system 10. In some implementations, the $NO_x$ threshold is constant across all operating conditions of the engine system 10. Basically, the predetermined $NO_x$ threshold is set such that average normalized tailpipe $NO_x$ values above the threshold indicate a 'bad' component and average normalized tailpipe $NO_x$ values below the threshold indicate a 'good' component. In some implementations, the predetermined $NO_x$ threshold is between about 150 and about 200 ppm. In one particular implementation, the predetermined $NO_x$ threshold is about 180 ppm.

According to one implementation, the hysteresis module 240 increments an aggregate decision (e.g., condition metric) counter when an average normalized tailpipe $NO_x$ value is below the $NO_x$ threshold, and decrements the aggregate decision counter when an average normalized tailpipe $NO_x$ value is above the $NO_x$ threshold. The hysteresis module 240 continually compares new average normalized tailpipe $NO_x$ values against the $NO_x$ threshold, and increments or decrements the aggregate decision counter until the aggregate decision counter meets either an upper count threshold or a lower count threshold. When the aggregate decision counter meets the upper count threshold, the hysteresis module 240 sets the condition of the component to 'good.' However, when the aggregate decision counter meets the lower count threshold, the hysteresis module 240 sets the condition of the component to 'bad.' When the aggregate decision counter is between the upper and lower count thresholds, the hysteresis module 240 does not set the condition of the component (e.g., leaves undecided the condition of the component). The upper and lower count thresholds are set to provide a desired level of certainty or accuracy (e.g., additional level of filtering) to the condition of the component decided by the hysteresis module 240. The higher and lower the respective upper and lower count thresholds, the higher the accuracy of the decision. However, the larger the difference between the upper and lower count thresholds, the higher the likelihood of false positives.

Although in the above-described embodiment the hysteresis module 240 utilizes average normalized tailpipe $NO_x$ values from the diagnostic filtering module 220 to decide the condition of the component, in other embodiments, the component condition decision can be obtained without averaging the normalized tailpipe $NO_x$ values 270 from the diagnostic module 210. In such embodiments, either the controller 40 does not have a diagnostic filtering module 220, or the diagnostic filtering module 220 is disabled. Further, although in the above-described embodiment the hysteresis module 240 utilizes a counter-based hysteresis approach for deciding the condition of the component, in other embodiments, other hysteresis approaches can be used. Moreover, in some embodiments, the OBD module 230 does not have a hysteresis module 240, and decides the condition of the component based on each comparison of the normalized tailpipe $NO_x$ value and the predetermined $NO_x$ threshold.

After a decision on the condition of the component has been made, either with or without the hysteresis module 240, the OBD module 230 generates the OBD signal 260, which communicates the decision to the OBD system 90 for alerting a user of the component's condition. The OBD system 90 may alert the user of the component's condition via the activation of a visual or auditory alert (e.g., when the condition is 'bad' or the decision is 'fail', or the non-activation of an alert (e.g., when the condition is 'good' or the decision is 'pass').

The component whose condition is determined by the controller 40 can be any of various components upstream of the SCR system 150, and more particularly the SCR catalyst 152. In one embodiment, the component is the oxidation catalyst 140. In another embodiment, the component is the PM filter 142. The predetermined or precalibrated values of the enablement condition thresholds associated with the enablement module 200 and component condition thresholds associated with the OBD module 230 may vary based on which component's condition is being diagnosed. For example, the thresholds associated with the oxidation catalyst 140 may be the same as or different than the corresponding thresholds associated with the PM filter 142.

Figure 6:
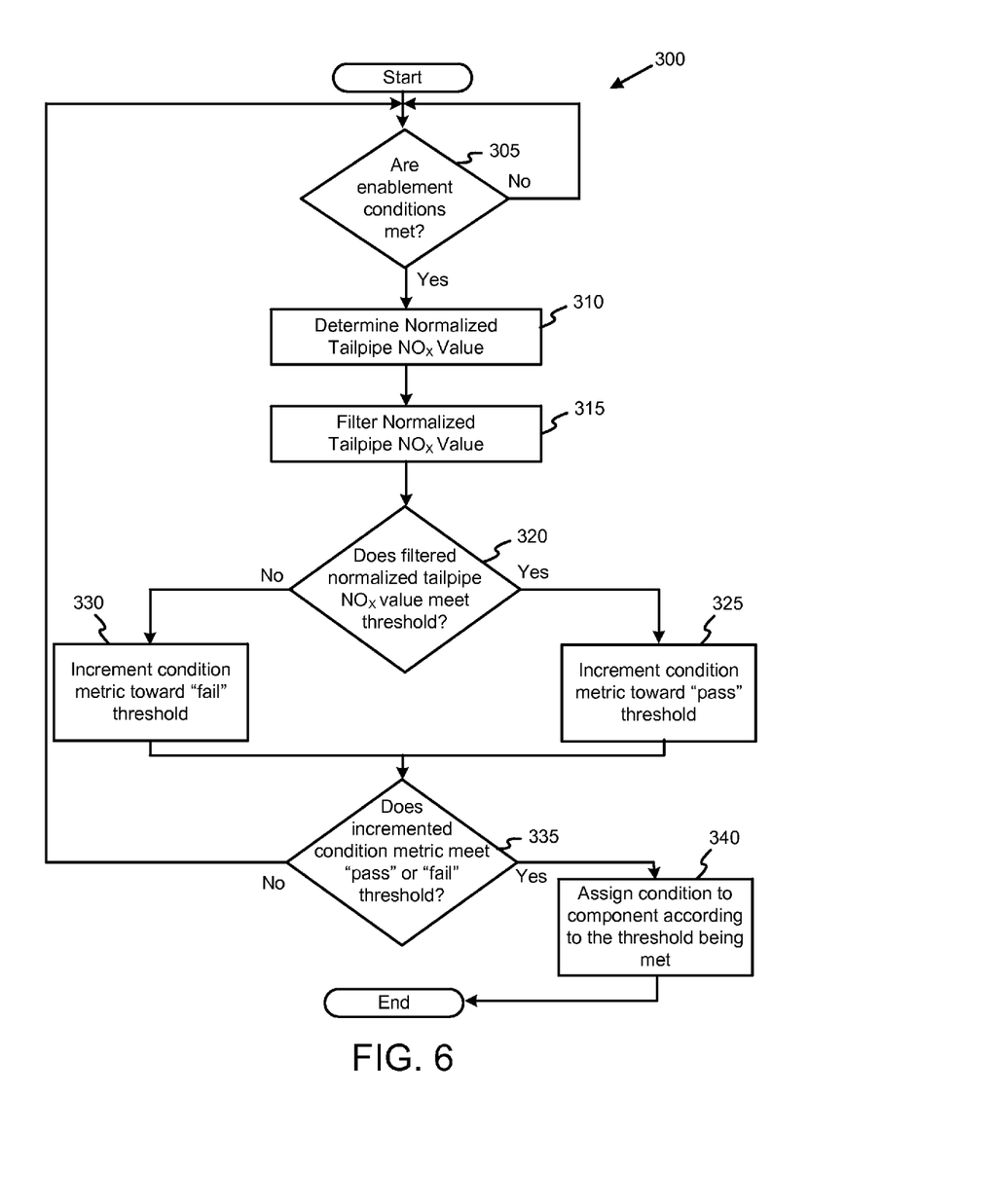
FIG. 6 is a schematic flow chart diagram of a method for diagnosing a condition of an exhaust aftertreatment component in accordance with one representative embodiment.

Referring to FIG. 6, a method 300 for diagnosing a condition of an aftertreatment system component (e.g., upstream of an SCR catalyst). In certain implementations, the steps of the method 300 may be executed by the modules of the controller 40 described above. The method 300 begins by determining whether the controlling enablement conditions are met at 305. The controlling enablement conditions can be a single enablement condition (e.g., one of the enablement conditions monitored by the enablement module 200) or a plurality of enablement conditions (e.g., more than one of the enablement conditions monitored by the enablement module 200). If the controlling enablement conditions are met at 305, then the method 300 proceeds to determine a normalized tailpipe $NO_x$ (e.g., $NO_x$/ANR) value at 310. However, if the controlling enablement conditions are not met at 305, then the method 300 repeats the decision step at 305 until the controlling enablement conditions are met.

After determining the normalized tailpipe $NO_x$ value at 310, the method 300 filters the normalized tailpipe $NO_x$ value at 315 to convert the normalized tailpipe $NO_x$ value into an average or filtered normalized tailpipe $NO_x$ value. The method 300 then determines whether the filtered normalized tailpipe $NO_x$ value meets a $NO_x$ threshold at 320. If the filtered normalized tailpipe $NO_x$ value meets the $NO_x$ threshold, then the method 300 increments a condition metric toward a 'pass' threshold at 325. However, if the filtered normalized tailpipe $NO_x$ value does not meet the $NO_x$ threshold, then the method 300 increments (e.g., decrements) a condition metric toward a 'fail' threshold at 330.

The method 300 then determines whether the incremented condition metric meets the 'pass' or 'fail' threshold at 335. If the incremented condition metric does not meet either of the 'pass' or 'fail' thresholds at 335, then no decision is made on the condition of the component, and the method 300 returns to determine if the controlling enablement conditions are met at 305. However, if the incremented condition metric does meet either of the 'pass' or 'fail' thresholds at 335, then the method 300 sets or assigns the condition of the component according to which threshold has been met at 340. For example, if the 'pass' threshold is met at 335, then the condition of the component is set to 'pass.' In contrast, if the 'fail' threshold is met at 335, then the condition of the component is set to 'fail.' After the execution of step 340, the method 300 may end as shown, or may return to determine if the controlling enablement conditions are met at 305.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for diagnosing a condition of a component of an exhaust aftertreatment system in exhaust receiving communication with an internal combustion engine, the exhaust aftertreatment system having a selective catalytic reduction (SCR) catalyst, comprising:
   a controller structured to be coupled to the exhaust aftertreatment system, the controller including:
      a diagnostic module structured to determine a normalized tailpipe nitrogen-oxide $NO_x$ value based on a tailpipe $NO_x$ sensor signal and a ratio of an SCR inlet ammonia ($NH_3$) flow rate to an SCR inlet $NO_x$ flow rate;
      a component condition module structured to determine a condition of the component based on the normalized tailpipe $NO_x$ value; and
      an on-board diagnostic module structured to communicate an alert signal to an on-board diagnostic system, wherein the alert signal causes the on-board diagnostic system to provide an indication of the condition of the component to a user.

2. The apparatus of claim 1, wherein the component comprises a hydrocarbon oxidation catalyst.

3. The apparatus of claim 1, wherein the component comprises a particulate matter filter.

4. The apparatus of claim 1, wherein the diagnostic module is structured to determine the normalized tailpipe $NO_x$ value only during transient engine operating conditions.

5. The apparatus of claim 4, wherein the transient engine operating conditions comprise an engine outlet $NO_x$ flux being between upper and lower engine outlet $NO_x$ flux thresholds.

6. The apparatus of claim 1, wherein the diagnostic module is structured to determine the normalized tailpipe $NO_x$ value only if a temperature condition of the SCR catalyst is within a predetermined temperature range.

7. The apparatus of claim 6, wherein the temperature condition comprises a sum of an SCR mid-bed temperature weighted according to a first factor and an SCR outlet exhaust temperature weighted according to a second factor.

8. The apparatus of claim 1, wherein the controller further includes a filtering module structured to convert the normalized tailpipe $NO_x$ value into an exponentially weighted moving average of the normalized tailpipe $NO_x$ value, and wherein the condition of the component is based on the exponentially weighted moving average of the normalized tailpipe $NO_x$ value.

9. The apparatus of claim 1, wherein the component condition module determines the condition of the component based on a hysteresis of a plurality of normalized tailpipe $NO_x$ values.

10. The apparatus of claim 1, wherein the diagnostic module is structured to determine the normalized tailpipe $NO_x$ value only when enablement conditions are met, the enablement conditions comprising a temperature condition of the SCR catalyst being within a predetermined temperature range, transient engine operating conditions, the tailpipe $NO_x$ sensor signal is within a first predetermined range, an $NH_3$-to-$NO_x$ ratio entering the SCR catalyst is within a second predetermined range, there is no active component regeneration occurring, and the $NO_x$ sensor signal is currently stable.

11. The apparatus of claim 10, wherein the enablement conditions further comprise a rate of change of switching between ammonia reductant modes is within a predetermined range, excess hydrocarbons are not entering into the component of the exhaust aftertreatment system, the $NO_x$ sensor signal historically has been stable, and no on-board diagnostic faults are triggered.

12. A system, comprising:
an internal combustion engine generating an exhaust gas;
an exhaust aftertreatment system in exhaust gas receiving communication with the internal combustion engine, the exhaust aftertreatment system comprising an exhaust treatment component and a selective catalytic reduction (SCR) catalyst downstream of the exhaust treatment component; and
a controller structured to determine a normalized level of nitrogen-oxide ($NO_x$) in exhaust gas downstream of the SCR catalyst, and further structured to determine a condition of the exhaust treatment component based on the normalized level of $NO_x$, and further structured to communicate an alert signal to an on-board diagnostic system, wherein the alert signal causes the on-board diagnostic system to provide an indication of the condition of the exhaust treatment component to a user.

13. The system of claim 12, wherein the exhaust treatment component comprises at least one of a hydrocarbon oxidation catalyst and a particulate matter filter.

14. The system of claim 12, further comprising a $NO_x$ sensor positioned downstream of the SCR catalyst and structured to detect a level of $NO_x$ in exhaust gas downstream of the SCR catalyst, wherein the normalized level of $NO_x$ is equal to the detected level of $NO_x$ divided by a ratio of the flow rate of ammonia entering the SCR catalyst to the flow rate of $NO_x$ entering the SCR catalyst.

15. The system of claim 12, wherein the controller determines the normalized level of $NO_x$ and the condition of the exhaust treatment components only during transient engine operating conditions and if a temperature condition of the SCR catalyst is within a predetermined temperature range.

16. A method for diagnosing a condition of a component of an exhaust aftertreatment system in exhaust receiving communication with an internal combustion engine, the exhaust aftertreatment system having a selective catalytic reduction (SCR) catalyst downstream of the component, comprising:

detecting a quantity of nitrogen-oxide ($NO_x$) in exhaust gas downstream of the SCR catalyst;
normalizing the detected quantity of $NO_x$ based on a ratio of an ammonia $NH_3$ flow rate upstream of the SCR catalyst to a $NO_x$ flow rate upstream of the SCR catalyst;
determining the condition of the component based on the normalized detected quantity of $NO_x$; and
communicating an alert signal to an on-board diagnostic system, wherein the alert signal causes the on-board diagnostic system to provide an indication of the condition of the component to a user.

17. The method of claim 16, wherein detecting the quantity of $NO_x$, normalizing the detected quantity of $NO_x$, and determining the condition of the component is performed only during transient operating conditions and when a temperature condition of the SCR catalyst is within a predetermined temperature range.

18. The method of claim 16, wherein determining the condition of the component comprises comparing the normalized detected quantity of $NO_x$ to a predetermined $NO_x$ threshold.

19. The method of claim 18, wherein determining the condition of the component comprises upwardly incrementing a condition metric if the normalized detected quantity of $NO_x$ exceeds the predetermined threshold, and downwardly incrementing the condition metric if the normalized detected quantity of $NO_x$ is less than the predetermined threshold, and wherein determining the condition of the component further comprises assigning a first condition to the component when the condition metric equals an upper threshold and assigning a second condition to the component when the condition metric equals a lower threshold.

20. The method of claim 16, wherein providing an indication of the condition of the component includes providing at least one of a visual alert and an auditory alert.

\* \* \* \* \*